United States Patent
Mukuta et al.

(10) Patent No.: US 6,807,452 B2
(45) Date of Patent: Oct. 19, 2004

(54) SCHEDULING METHOD AND PROGRAM FOR A SUBSTRATE PROCESSING APPARATUS

(75) Inventors: Nobuhiro Mukuta, Kyoto (JP); Jun Kawai, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 10/241,224

(22) Filed: Sep. 10, 2002

(65) Prior Publication Data

US 2003/0055522 A1 Mar. 20, 2003

(30) Foreign Application Priority Data

Sep. 20, 2001  (JP) ........................................ 2001-286310

(51) Int. Cl.[7] .............................................. G06F 19/00
(52) U.S. Cl. ........................... 700/99; 700/100; 700/121
(58) Field of Search .................... 700/99–103, 121; 438/5

(56) References Cited

U.S. PATENT DOCUMENTS 6,415,194 B1 * 7/2002 Gleditsch et al. ............. 700/99
6,456,894 B1 * 9/2002 Nulman ...................... 700/121
6,519,498 B1 * 2/2003 Jevtic et al. ................ 700/101
6,591,153 B2 * 7/2003 Crampton et al. .......... 700/103

FOREIGN PATENT DOCUMENTS

JP    2001-102425    4/2001

* cited by examiner

Primary Examiner—Leo Picard
Assistant Examiner—Alexander Kosowski
(74) Attorney, Agent, or Firm—Ostrolenk, Faber, Gerb & Soffen, LLP (57) ABSTRACT

A method of preparing a schedule for a substrate processing apparatus having a plurality of resources for processing substrates, the schedule determining timing of using each resource for processing the substrate. The method comprising the steps of determining the timing of using each resource in advance of starting an actual processing of the substrates, defining a capacity resource as a resource usable within a maximum quantity of consumption of a consumer item used by the resources, and using the resources in processing the substrates while avoiding a total quantity of the consumer item used by the resources exceeding the maximum quantity of consumption of the capacity resource.

20 Claims, 7 Drawing Sheets

SCHEDULING METHOD AND PROGRAM FOR A SUBSTRATE PROCESSING APPARATUS

BACKGROUND OF THE INVENTION (1) Field of the Invention

The present invention relates to a scheduling method and program for a substrate processing apparatus that performs predetermined processes on semiconductor wafers or glass substrates for liquid crystal displays (which will be referred to hereinafter simply as substrates).

(2) Description of the Related Art

Conventionally, little power-saving effort has been made with this type of substrate processing apparatus. The apparatus has an electrical feature designed by taking into consideration a possibility of simultaneously operating all power-consuming components.

However, where the apparatus includes a plurality of heaters that consume a relatively large quantity of electricity, power consumption is reduced by prohibiting a simultaneous use of such heaters and exclusively using each heater by successively switching from one heater to another.

The conventional practice noted above has the following drawbacks.

The exclusive control is carried out though occasionally a margin may be allowed for power consumption. Thus, extended periods of time may be needed for increasing temperature by the heaters. This results in a problem of lowering the use efficiency of a resource such as a chemical processing unit.

The apparatus uses not only electric power but other consumer items, such as deionized water, chemical solution and gas, that have fixed maximum quantities available per unit time. Where these items are supplied to a plurality of locations, consumption per unit time is reduced, again, by exclusively supplying the items. Thus, a problem similar to that relating to electric power arises also with deionized water, chemical solution and gas.

Further, as opposed to the consumption noted above, waste fluids discharged from the apparatus, including waste liquids such as a treating solution and deionized water and an exhaust gas such as nitrogen gas, are transmitted to waste treating equipment having a fixed disposal capacity per unit time. Thus, an exclusive control must be carried out for resources that discharge wastes, so that the wastes are discharged at rates not exceeding the disposal capacity. This poses a problem of lowering the use efficiency of the resources also.

SUMMARY OF THE INVENTION

The present invention has been made having regard to the state of the art noted above, and its object is to provide a scheduling method and program for a substrate processing apparatus, in which a capacity resource is used by taking an expected use of a consumer item into account, thereby making efficient use of resources while controlling the resources not to exceed maximum consumption.

Another object of the invention is to provide a scheduling method and program for a substrate processing apparatus, in which a capacity resource is used by taking an expected discharge of a waste into account, thereby making efficient use of resources while controlling the resources not to exceed a maximum discharge rate.

The above objects are fulfilled, according to the present invention, by a method of preparing a schedule for a substrate processing apparatus having a plurality of resources for processing substrates, the schedule determining timing of using each resource for processing the substrates, the method comprising the steps of determining the timing of using each resource in advance of starting an processing of the substrates, defining a capacity resource as a resource usable within a maximum quantity of consumption of a consumer item used by the resources, and using the resources in processing the substrates while avoiding a total quantity of the consumer item used by the resources exceeding the maximum quantity of consumption of the capacity resource.

In determining use timing of each resource before a processing operation, a total of the consumer item is prevented from exceeding the maximum consumption of the capacity resource. In this way, the resources are used efficiently while effecting controls not to exceed the maximum consumption. As a result, the substrate processing apparatus achieves improved throughput.

The resources in the present invention include, for example, a substrate transport mechanism that uses electric power in time of movement, a deionized water cleaning unit that uses electric power as well as deionized water and nitrogen gas, a warm water unit that uses electric power to increase temperature, a chemical processing unit that uses a chemical solution such as of sulfuric acid or hydrogen peroxide and electric power, and a heating unit that uses electric power for heating.

It is preferred that the capacity resource determines total consumption per unit time each time the resources are used, and when the total consumption exceeds the maximum consumption, avoids use of one of the resources responsible for an excess part of the total consumption.

Total consumption per unit time by all the resources used simultaneously is determined. When this total exceeds the maximum consumption of the capacity resource, the use of the resource responsible for the excessive consumption is avoided to maintain the maximum consumption. Thus, the total of the consumer item consumed by all the resources used simultaneously is held within the maximum consumption of the capacity resource.

In another aspect of the invention, there is provided a method of preparing a schedule for a substrate processing apparatus having a plurality of resources for processing substrates, the schedule determining timing of using each resource for processing the substrates, the method comprising the steps of determining the timing of using each resource in advance of starting an processing of the substrates, defining a capacity resource as a resource usable within a maximum quantity of a waste discharged from the resources, and using the resources in processing the substrates while avoiding a total quantity of the waste discharged from the resources exceeding the maximum quantity of discharge of the capacity resource.

In determining use timing of each resource before a processing operation, a total of the waste is prevented from exceeding the maximum discharge of the capacity resource. In this way, the resources are used efficiently while effecting controls not to exceed the maximum discharge. As a result, the substrate processing apparatus provides improved throughput.

The resources in the present invention include, for example, a deionized water cleaning unit that discharges used deionized water and nitrogen gas, a chemical processing unit that discharges a used chemical solution and a drying unit that discharges used nitrogen gas.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Preferred embodiments of the present invention will be described in detail hereinafter with reference to the drawings.

Figure 1:
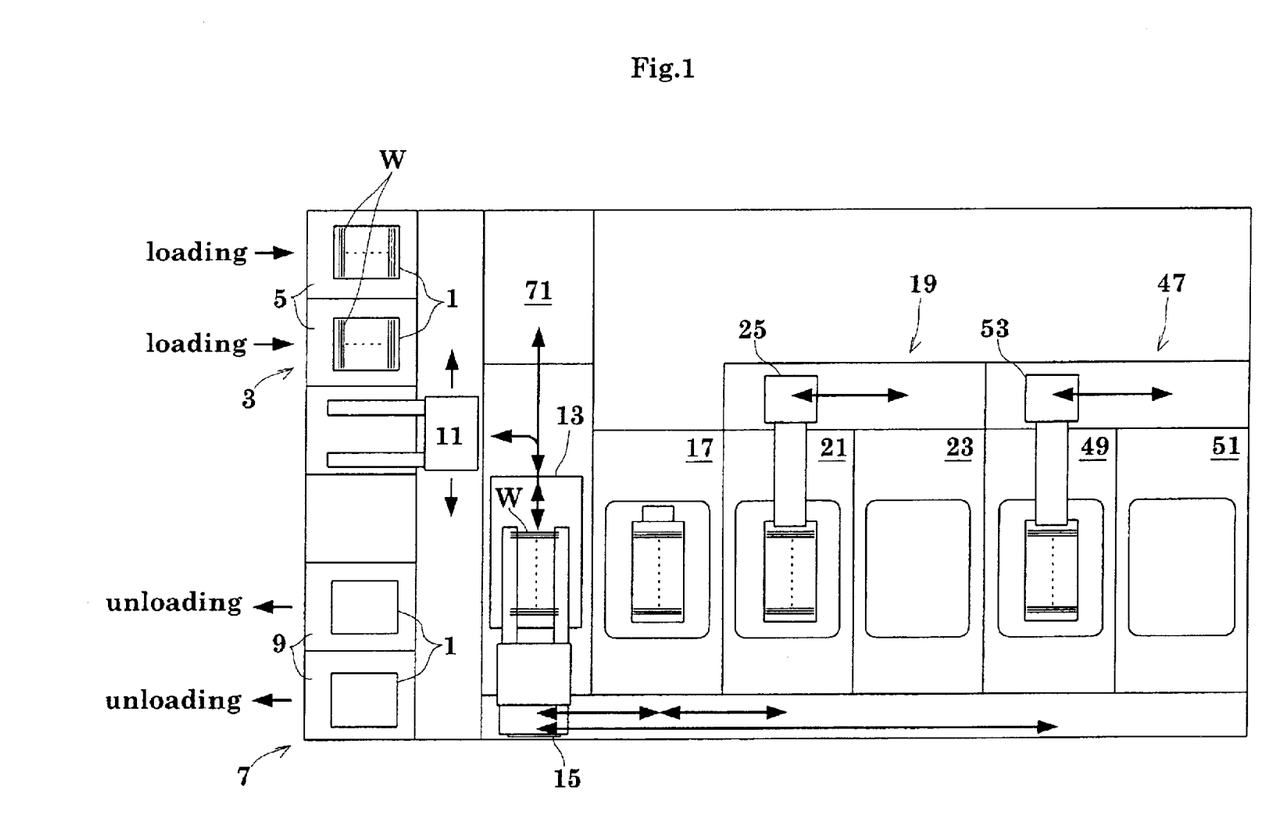
FIG. 1 is a plan view showing an outline of a substrate processing apparatus according to the invention.
Figure 2:
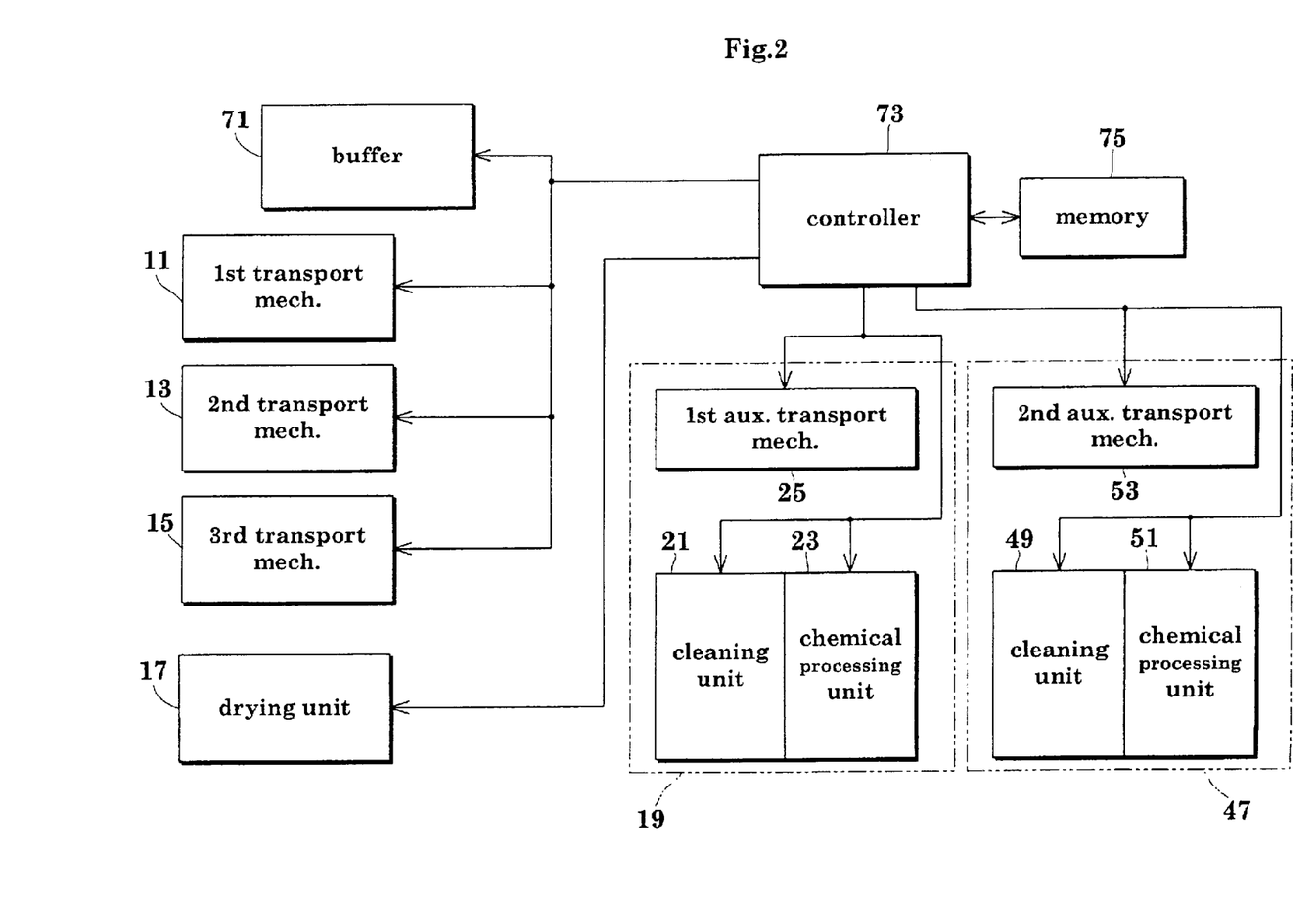
FIG. 2 is a block diagram of the substrate processing apparatus.

FIGS. 1 and 2 show one embodiment of the invention. FIG. 1 is a plan view showing an outline of a substrate processing apparatus. FIG. 2 is a block diagram of the apparatus.

This substrate processing apparatus performs a chemical process, a deionized water cleaning process and a drying process on wafers W, for example. A plurality of (e.g. 25) wafers W are stored in vertical posture in each cassette 1. Cassettes 1 containing wafers W to be processed are placed in a loading section 3.

The loading section 3 includes two support tables 5 for receiving the cassettes 1. An unloading section 7 is disposed opposite the loading section 3 across a middle portion of the substrate processing apparatus. The unloading section 7 is used for delivering processed wafers W as stored in cassettes 1. As does the loading section 3, the unloading section 7 includes two support tables 9 for receiving the cassettes 1.

In an area extending along the loading section 3 and unloading section 7 is a first transport mechanism 11 movable between these sections. The first transport mechanism 11 transports each cassette 1 containing the plurality of wafers W from the loading section 3 to a second transport mechanism 13.

The second transport mechanism 13 takes all the wafers W out of the cassette 1, and transports all the wafers W to a third transport mechanism 15. The second transport mechanism 13 also receives processed wafers W from the third transport mechanism 15, deposits the wafers W in a cassette 1, and transports the cassette to the first transport mechanism 11.

The third transport mechanism 15 is constructed movable longitudinally of the substrate processing apparatus, and receives and delivers the wafers W from/to the second transport mechanism 13. A drying unit 17 is disposed in the most upstream position with respect to the direction of movement of the third transport mechanism 15. The drying unit 17 is operable to dry a plurality of wafers W placed in a low-pressure chamber.

A first processing section 19 is disposed next to the drying unit 17 in the direction of movement of the third transport mechanism 15. The first processing section 19 includes a deionized water cleaning unit 21 for cleaning a plurality of wafers W with deionized water, and a chemical processing unit 23 for applying a chemical solution to the plurality of wafers W.

A first auxiliary transport mechanism 25 transports the wafers W within the first processing section 19, and receives and delivers the wafers W from/to the third transport mechanism 15. The first auxiliary transport mechanism 25, when in a non-processing position over the deionized water cleaning unit 21, receives and delivers the wafers W from/to the third transport mechanism 15. This wafer transfer does not take place in a non-processing position over the chemical processing unit 23. When processing the wafers W, the first auxiliary transport mechanism 25 descends to processing positions inside tanks of the deionized water cleaning unit 21 and chemical processing unit 23.

A second auxiliary transport mechanism 53 has the same functions as the first auxiliary transport mechanism 25. The second auxiliary transport mechanism 53 transports the wafers W within a second processing section 47 including a deionized water cleaning unit 49 and a chemical processing unit 51.

A buffer device 71 is disposed in a position adjacent the first transport mechanism 11 and second transport mechanism 13. The buffer device 71 has functions for receiving and delivering wafers W from/to the second transport mechanism 13 and temporarily storing a plurality of wafers W (hereinafter called lot) not subjected to scheduling. When subjected to scheduling, the lot is taken up and transported by the second transport mechanism 13.

The substrate processing apparatus having the above construction is controlled overall by a controller 73 as shown in the block diagram of FIG. 2.

The controller 73 includes a CPU and the like for determining, based on a procedure corresponding to a scheduling program described hereinafter, timing of using resources such as the chemical processing units 23 and 51 according to recipes. This timing of use is determined before starting actual processes on lots. Subsequently, the lots are processed according to the recipes by using the resources based on a schedule prepared.

A memory 75 stores a plurality of recipes prepared by the user of the substrate processing apparatus and determining how the lots should be processed, the scheduling program, the schedule prepared, and a processing program for executing the schedule prepared.

The present invention is characterized by a novel concept of what is termed capacity resource. This allows the respective resources to use a consumer item at a rate not exceeding maximum consumption. In the example described hereinafter, the consumer item in question is "electric power".

The controller 73 schedules operations using the respective resources, and prohibits each resource to use electric power in excess of maximum consumption of the capacity resource. The respective resources are used along with the capacity resource.

More particularly, total consumption per unit time is determined each time the resources are used. When this total exceeds the maximum consumption, the use of the resource responsible for the excessive consumption is stopped to avoid exceeding the maximum consumption of the capacity resource.

The procedure corresponding to the scheduling program will be described with reference to the time charts shown in FIGS. 3 through 7. To facilitate understanding, part of the recipes will be taken for example.

Figure 3:
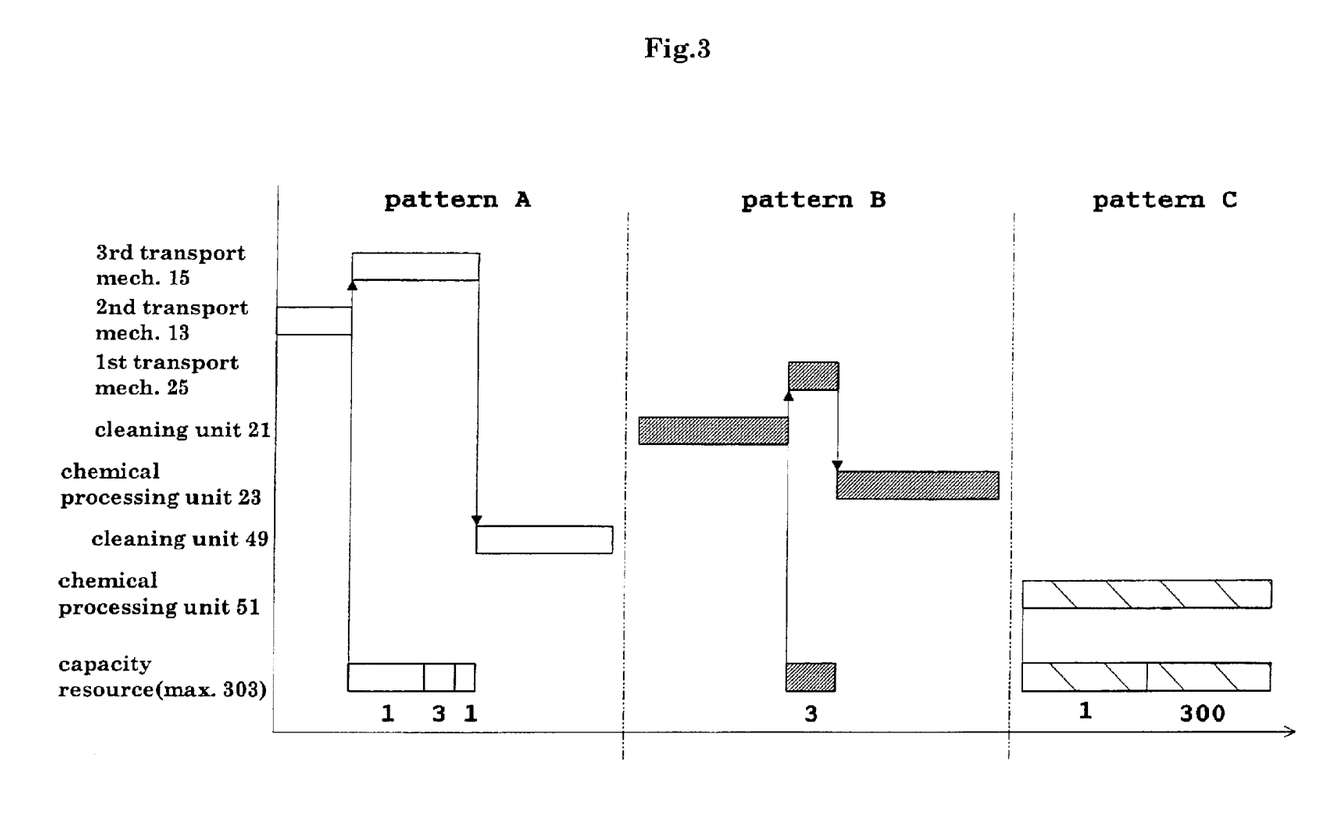
FIG. 3 is a time chart showing a relationship between resources and capacity resource.

A relationship between the resources and capacity resource will be described first with reference to FIG. 3.

Pattern A exemplifies a case of the third transport mechanism 15 moving from a position adjacent the second transport mechanism 13 to the deionized water cleaning unit 49. In this case, the resource of the third transport mechanism 15 is used, with the capacity resource used for the same period of time. The capacity resource is set to a maximum electric power consumption of 303, and consumes electric power "1, 3, 1" with the operation of the third transport mechanism 15.

In this case, for example, power is consumed per unit time and its unit is "W", but the unit is omitted from the following description. The capacity resource may be used along with other resources at the same time, in which case total power consumption must not exceed the maximum consumption set to the capacity resource. The maximum consumption of the capacity resource is determined based on the electrical design of the substrate processing apparatus.

Pattern B exemplifies a case of the first auxiliary transport mechanism 25 moving from the deionized water cleaning unit 21 to the chemical processing unit 23. In this case, the resource of the first auxiliary transport mechanism 25 is used. with the capacity resource used for the same period of time. The capacity resource consumes electric power of "3" with the operation of the first auxiliary transport mechanism 25.

Pattern C exemplifies a case of solution changing in the chemical processing unit 51. In this case, the resource of the chemical processing unit 51 is used, with the capacity resource used for the same period of time. The capacity resource consumes electric power "1, 300" with the solution changing operation of the chemical processing unit 51. Generally, solution changing requires heaters to heat the new solution to a temperature suited to chemical treatment, and therefore this consumes far more power than other resources.

Next, a scheduling of processing steps including the above patterns A through C will particularly be described with reference to FIGS. 4 through 7.

Figure 4:
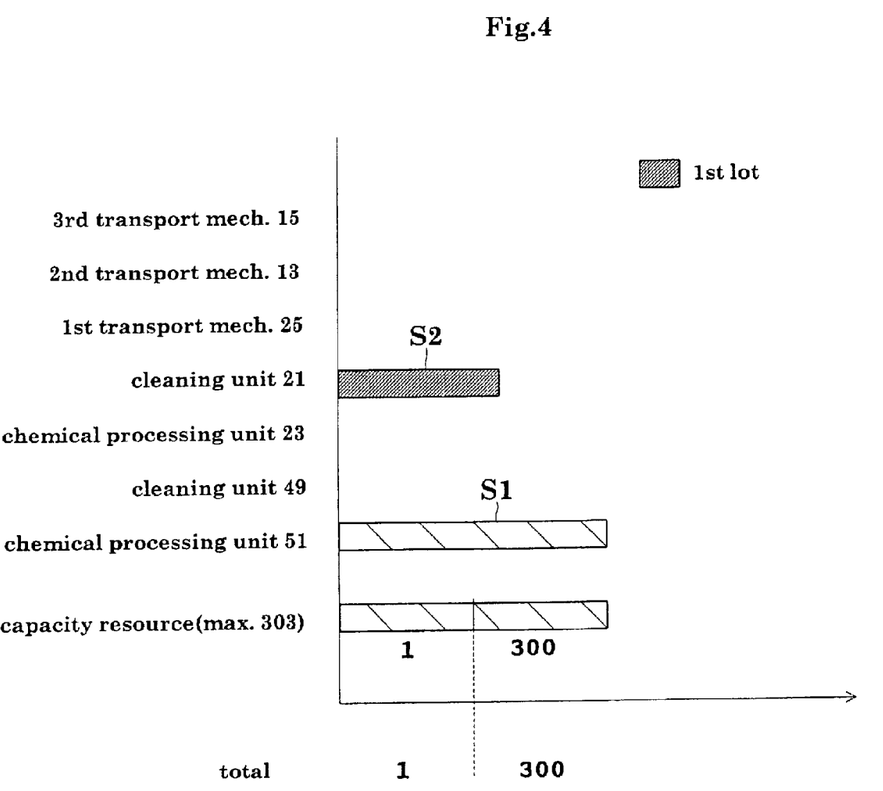
FIG. 4 is a time chart showing part of a scheduling example.

First, the resource of the chemical processing unit 51 is used in a solution changing schedule at step S1. For processing a first lot, the resource of the deionized water cleaning unit 21 is used at step S2. In connection with the above, the capacity resource is used, with total values of power consumption at "1, 300" (pattern C above).

Figure 5:
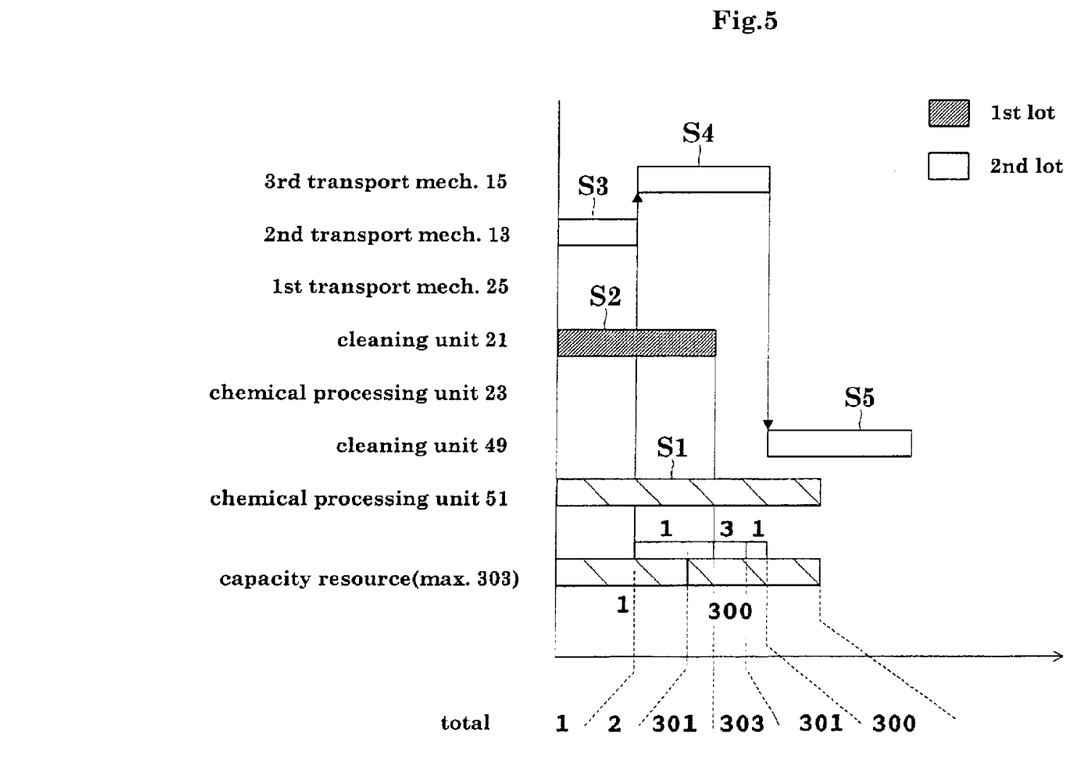
FIG. 5 is a time chart showing part of the scheduling example.

Next, as shown in FIG. 5, the resources of the second transport mechanism 13, third transport mechanism 15 and deionized water cleaning unit 49 are used at steps S3 through S5 for processing a second lot. The capacity resource is used along with the use of the third transport mechanism 15. Power consumption at this time is "1, 3, 1" as in pattern A above. Thus, the total values of power consumption become "1, 2, 301, 303, 301, 300". That is, this schedule can fit in the maximum power consumption of the capacity resource, i.e. "303".

Figure 6:
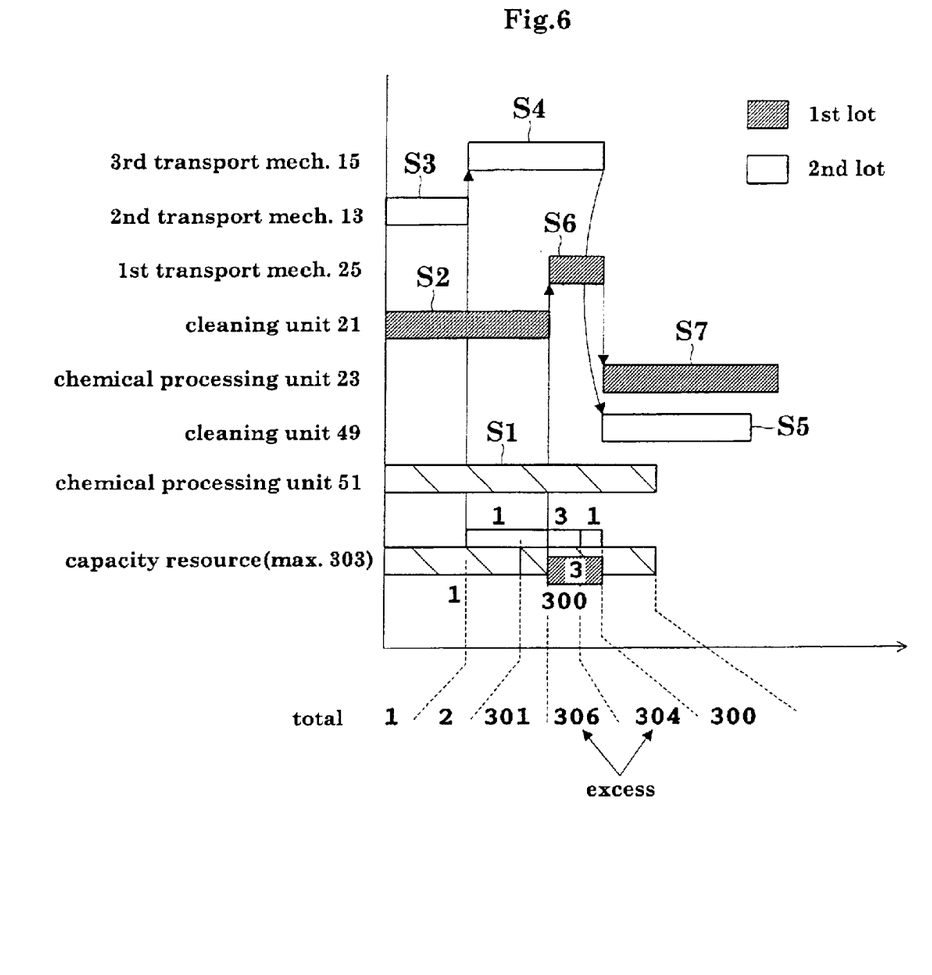
FIG. 6 is a time chart showing part of the scheduling example.

Further, as shown in FIG. 6, for treating the first lot with the chemical solution after cleaning with water, the resources of the first auxiliary transport mechanism 25 and chemical processing unit 23 are used at steps S6 and S7. In particular, step S6 is allocated immediately after step S2 with no intermission. Thus, the capacity resource is used along with the first auxiliary transport mechanism 25. Since power consumption at this time (pattern B) is "3", the total values of power consumption become "1, 2, 301, 306, 304, 300".

The maximum power consumption of the capacity resource is set to "303". However, at the point of time when the above schedule is prepared, the total values of power consumption (306 and 304) exceed the maximum power consumption. Thus, the use of the resource responsible for these excesses is avoided, and the operation is rescheduled by adopting a shift of time.

Figure 7:
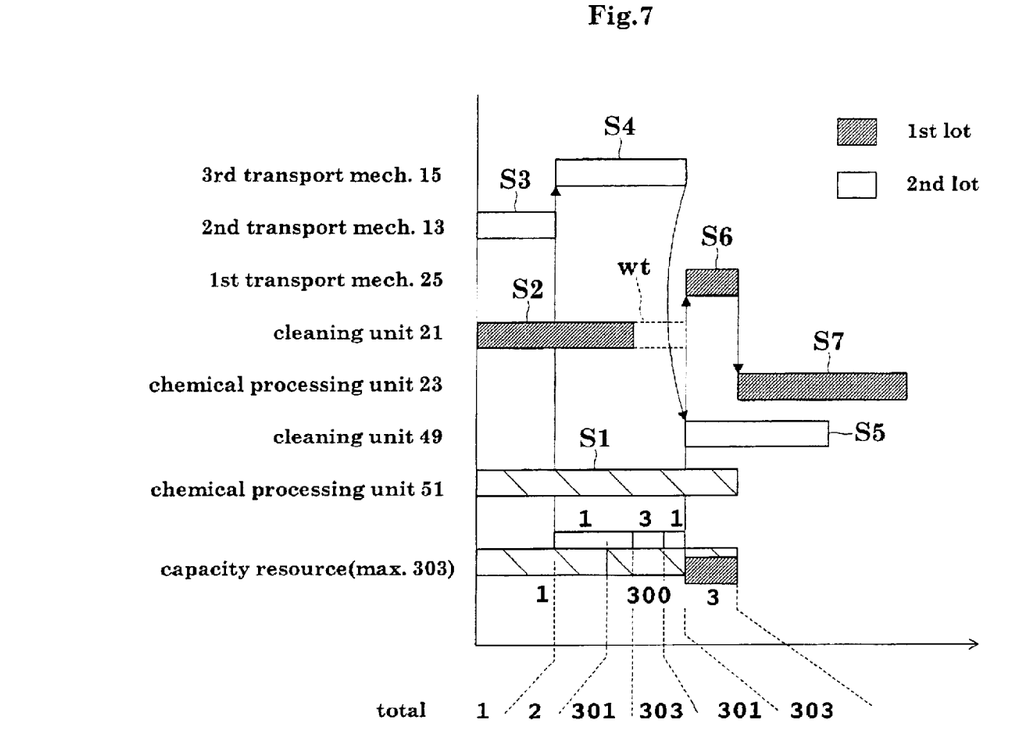
FIG. 7 is a time chart showing part of the scheduling example.

Here, as shown in FIG. 7, a waiting time wt is put immediately after step S2, deferring steps S6 and S7 for the first lot. This makes the total values of power consumption "1, 2, 301, 303, 301, 303". Thus, the total values of power consumption fit in the maximum power consumption of the capacity resource. The schedule prepared in this way is stored in the memory 75 for execution by the controller 73.

Use timing of each resource is determined as described above before an actual processing. The total value of power consumption of each resource is suppressed not to exceed the maximum power consumption of the capacity resource. As a result, each resource may be used efficiently while effecting controls so as not to exceed the maximum power consumption. In solution changing, for example, temperature may be increased quickly by using a plurality of heaters to the full within a predetermined amount of power consumption, rather than using the heaters in an exclusive way. As a result, the substrate processing apparatus has improved throughput.

To facilitate understanding, the above description is made without taking detailed power consumption into account. That is, in pattern A above, only the third transport mechanism 15 uses the capacity resource. In an actual situation, power is consumed also when the second transport mechanism 13 and deionized water cleaning unit 49 are used. In reality, therefore, the total values of power consumption are greater than "1, 2, 301, 303, 301, 303" in FIG. 7. Naturally, it is preferable to consider all such details of power consumption in an actual scheduling.

The above embodiment has been described by taking electric power as an example of consumer items. Apart from electric power, the invention is applicable also to deionized water, a chemical solutions such as of sulfuric acid, hydrogen peroxide or IPA, and a gas such as nitrogen.

Take deionized water for example, the substrate processing apparatus is supplied with deionized water whose available quantity per unit time is dependent on deionized water supplying equipment, and piping and pumps and the like included in the substrate processing apparatus. Thus, use timing is adjusted to avoid the deionized water cleaning units 21, 49 and the chemical processing units 23, 51 being used simultaneously with a total value of deionized water consumption exceeding the capacity resource.

The above description concerns the "consumer items" all consumed in the substrate processing apparatus. The above technique is effective also for "wastes" discharged from the substrate processing apparatus. That is, waste liquids such as deionized water, treating solution and chemical solution and exhaust gases such as nitrogen and ozone discharged from the substrate processing apparatus cannot be allowed to join ordinary drains or released to the atmosphere. Such wastes must be cleaned with waste treating equipment. However, the waste treating equipment has a limit to the capacity of unit-time disposal.

Then, a capacity resource as noted above is defined for wastes such as drains and exhausts. A maximum or upper limit is set to such discharges. Use timing of each resource that discharges waste is determined not to exceed a maximum discharge rate. By scheduling the operation in this way, each resource may be used efficiently while effecting controls so as not to exceed the maximum discharge rate. The same effect may be achieved as in the foregoing embodiment.

When scheduling an operation in advance, according to the present invention, it is desirable to use the following method in combination. The processing steps in the following method are cleaning processes in the above deionized water cleaning unit 21 and chemical processes in the chemical processing unit 51, and include blocks each having a series of such processes.

In processing a plurality of lots with a substrate processing apparatus having a plurality of processing sections for processing substrates, an order of processing the lots is determined based on a recipe including a plurality of processing steps for successively processing the lots in the processing sections. The above order is determined by allocating a first processing step for one of the lots, and thereafter allocating, as a next processing step, one of next processing steps for the lots preceded by a processing step having an earliest expected completion time.

By scheduling in advance, according to this method, a subsequent operation in the preceding processing step and a preliminary operation in the succeeding processing step may be overlapped. By selecting and allocating one of allocable processing steps preceded by a processing step completed early, as the next processing step, this next processing step may be completed in a reduced time. Thus, each processing section of the substrate processing apparatus is used effectively, thereby reducing standby time to improve time efficiency.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method of preparing a schedule for a substrate processing apparatus having a plurality of resources for processing substrates, the schedule determining timing of using each resource for processing the substrates, said method comprising the steps of:
   determining the timing of using each resource in advance of starting processing of the substrates;
   defining a capacity resource as a resource usable within a maximum quantity of consumption of a consumer item used by said resources; and
   controlling a computer for using said resources in processing the substrates such that, when a total quantity of said consumer item used by said resources exceeds said maximum quantity of consumption of said capacity resource, the use of the resource responsible for exceeding said maximum quantity of consumption is deferred until after a waiting time, while leaving undeferred the resources allocated before said total quantity exceeds said maximum quantity.

2. A method as defined in claim 1, wherein said capacity resource determines total consumption per unit time each time said resources are used, and when said total consumption exceeds said maximum consumption, the use of a transport mechanism responsible for an excess part of said total consumption is deferred.

3. A method as defined in claim 1, wherein said consumer item includes one of electric power, deionized water, a chemical solution and a gas.

4. A method as defined in claim 2, wherein said consumer item includes one of electric power, deionized water, a chemical solution and a gas.

5. A method as defined in claim 1, wherein said resources include one of a substrate transport mechanism, a deionized water cleaning unit, a warm water unit, a chemical processing unit and a heating unit.

6. A program for preparing a schedule for a substrate processing apparatus having a plurality of resources for processing substrates, the schedule determining timing of using each resource for processing the substrates, said program comprising the steps of:
   determining the timing of using each resource in advance of starting processing of the substrates;
   defining a capacity resource as a resource usable within a maximum quantity of consumption of a consumer item used by said resources; and
   controlling a computer for using said resources in processing the substrates such that, when a total quantity of said consumer item used by said resources exceeds said maximum quantity of consumption of said capacity resource, the use of the resource responsible for exceeding said maximum quantity of consumption is deferred until after a waiting time, while leaving undeferred the resource allocated before said total quantity exceeds said maximum quantity.

7. A program as defined in claim 6, wherein said capacity resource determines total consumption per unit time each time said resources are used, and when said total consumption exceeds said maximum consumption, the use of a transport mechanism responsible for an excess part of said total consumption is deferred.

8. A program as defined in claim 6, wherein said consumer item includes one of electric power, deionized water, a chemical solution and a gas.

9. A program as defined in claim 7, wherein said consumer item includes one of electric power, deionized water, a chemical solution and a gas.

10. A program as defined in claim 6, wherein said resources include one of a substrate transport mechanism, a deionized water cleaning unit, a warm water unit, a chemical processing unit and a heating unit.

11. A method of preparing a schedule for a substrate processing apparatus having a plurality of resources for processing substrates, the schedule determining timing of using each resource for processing the substrates, said method comprising the steps of:
   determining the timing of using each resource in advance of starting processing of the substrates;
   defining a capacity resource as a resource usable within a maximum quantity of a waste discharged from said resources; and
   controlling a computer for using said resources in processing the substrates such that, when a total quantity of said waste discharged from said resources exceeds said maximum quantity of discharge of said capacity resource the use of the resource responsible for exceeding said maximum quantity of discharge is deferred until after a waiting time, while leaving undeferred the resources allocated before said total quantity exceeds said maximum quantity.

12. A method as defined in claim 11, wherein said capacity resource determines a total quantity of discharge per unit time each time said resources are used, and when said total quantity of discharge exceeds said maximum quantity of discharge, avoids use of one of said resources responsible for an excess part of said total quantity of discharge.

13. A method as defined in claim 11, wherein said waste is one of a waste liquid and an exhaust gas.

14. A method as defined in claim 12, wherein said waste is one of a waste liquid and an exhaust gas.

15. A method as defined in claim 11, wherein said resources include one of a substrate transport mechanism, a deionized water cleaning unit, a warm water unit, a chemical processing unit and a heating unit.

16. A program for preparing a schedule for a substrate processing apparatus having a plurality of resources for processing substrates, the schedule determining timing of using each resource for processing the substrates, said program comprising the steps of:

determining the timing of using each resource in advance of starting processing of the substrates;

defining a capacity resource as a resource usable within a maximum quantity of a waste discharged from said resources; and controlling a computer for using said resources in processing the substrates such that, when a total quantity of said waste discharged from said resources exceeds said maximum quantity of discharge of said capacity resource, the use of the resource responsible for exceeding said maximum quantity of discharge is deferred until after a waiting time, while leaving undeferred the resources allocated before said total quantity exceeds said maximum quantity.

17. A program as defined in claim 16, wherein said capacity resource determines a total quantity of discharge per unit time each time said resources are used, and when said total quantity of discharge exceeds said maximum quantity of discharge, avoids use of one of said resources responsible for an excess part of said total quantity of discharge.

18. A program as defined in claim 16, wherein said waste is one of a waste liquid and an exhaust gas.

19. A program as defined in claim 17, wherein said waste is one of a waste liquid and an exhaust gas.

20. A program as defined in claim 16, wherein said resources include one of a substrate transport mechanism, a deionized water cleaning unit, a warm water unit, a chemical processing unit and a heating unit.

\* \* \* \* \*